United States Patent
Birks et al.

(10) Patent No.: US 6,603,912 B2
(45) Date of Patent: Aug. 5, 2003

(54) SINGLE MODE OPTICAL FIBRE HAVING A LARGE CONE PHOTONIC CRYSTAL

(75) Inventors: Timothy A Birks, Bath (GB); Jonathan C Knight, Bath (GB); Philip St J Russell, Bath (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/984,891

(22) Filed: Oct. 31, 2001

(65) Prior Publication Data

US 2002/0122644 A1 Sep. 5, 2002

Related U.S. Application Data

(63) Continuation of application No. 09/446,093, filed as application No. PCT/GB98/01782 on Jun. 17, 1998, now Pat. No. 6,334,019.

(30) Foreign Application Priority Data

Jun. 26, 1997 (GB) .............................................. 9713422

(51) Int. Cl.$^7$ ................................................ G02B 6/02
(52) U.S. Cl. ...................................... 385/125; 385/127
(58) Field of Search ................................ 385/123, 124, 385/125, 126, 127

(56) References Cited

U.S. PATENT DOCUMENTS

| | | | |
|---|---|---|---|
| 5,323,404 A | | 6/1994 | Grubb .......................... 385/31 |
| 6,097,870 A | * | 8/2000 | Ranka et al. ................ 385/127 |
| 6,301,420 B1 | * | 10/2001 | Greenaway et al. ........ 385/126 |

FOREIGN PATENT DOCUMENTS

| | | |
|---|---|---|
| EP | 0239772 | 10/1987 |
| EP | 0621496 | 10/1994 |

OTHER PUBLICATIONS

Birks I et al: "Full 2–D Photonic Bandgaps in Silica/Air Structures" Electronics Letters, vol. 31, No. 22, Oct. 26, 1995, pp. 1941–1943, XP000543391.

Knight J C et al: "All–Silica Single–Mode Optical Fiber with Photonic Crystal Cladding" Optics Letters, vol. 21, No. 19, Oct. 1, 1996, pp. 1547–1549, XP000630414.

* cited by examiner

Primary Examiner—Euncha Cherry
(74) Attorney, Agent, or Firm—Nixon & Vanderhye P.C.

(57) ABSTRACT

A large core photonic crystal fiber for transmitting radiation having a core comprising a substantially transparent core material and having a core diameter of at least $5\mu$. The fiber also comprises a cladding region surrounding the length of core material, wherein the cladding region comprises a first substantially transparent cladding material, having a first refractive index, and wherein the first substantially transparent cladding material has embedded along its length a substantially periodic array of holes, wherein the holes are filled with a second cladding material having a second refractive index less than the first refractive index, such that radiation input to the optical fiber is transmitted along the length of the core material in a single mode of propagation. In a preferred embodiment, the core diameter may be at least $20\mu$, and may be as large as $50\mu$. The fiber is capable of transmitting higher power radiation than conventional fibers, whilst maintaining propagation in a single mode. The core material may be doped with a material capable of providing amplification under the action of pump radiation input to the fiber. The invention also relates to a fiber amplifier and a fiber laser comprising a doped large core photonic crystal fiber. The fibre may also be used in a system for transmitting radiation comprising a plurality of lengths of large core photonic crystal fiber, separated by large core photonic crystal fiber amplifiers, such that the power of radiation transmitted through the system is maintained above a predetermined threshold power.

39 Claims, 6 Drawing Sheets

SINGLE MODE OPTICAL FIBRE HAVING A LARGE CONE PHOTONIC CRYSTAL

This application is a continuation of Application Ser. No. 09/446,093, filed Dec. 17, 1999, now which is a 371 of PCT/G898/01782, filed U.S. Pat. No. 6,334,019 Jun. 17, 1998.

BACKGROUND OF THE INVENTION

1. Field of the Invention

The invention relates to a single mode optical fibre which may be used for transmitting radiation at substantially higher powers than may be achieved using conventional means. The fibre does not suffer from non linear effects or optical damage at high powers to the same extent as conventional optical fibres. In particular, the fibre may be used as a single mode waveguide, in a single mode fibre laser or in a single mode fibre amplifier.

2. Discussion of Prior Art

Optical fibres are widely used to deliver light from one point to another and have application in communications, imaging and sensing. Conventionally, a typical optical fibre is a long strand of transparent material which is uniform along its length but which has a refractive index varying across its cross-section. For example, a central core region of higher refractive index is surrounded by a cladding region with a lower refractive index. Such a fibre may be made from fused silica with a cladding of pure silica surrounding a core made from silica into which deliberate impurities have been introduced to raise the refractive index. Light is confined in or near the core by the process of total internal reflection which takes place at the boundary between the core and the cladding.

In general, a fibre of this type may support more than one guided mode of propagation confined to the core (i.e. multi mode fibre), these modes travelling along the fibre at different phase velocities. However, if the core is made to be sufficiently small, only one guided mode of propagation will be confined to the core, the fundamental mode (i.e. a single mode fibre). That is, the distribution of light emerging from the fibre is unchanged when the conditions at the launch end of the fibre are chanced and when the fibre itself is subjected to disturbances such as transverse compression or bending. Typically, a fibre designed to carry single mode light having a wavelength of 1500 nm may have a few percent of germanium dopant in the core, with a core diameter of 9 $\mu$m.

More recently, a photonic crystal fibre (PCF) has been developed comprising a cladding made of a transparent material in which an array of holes are embedded along the length of the fibre [J. C. Knight, et al., *Opt. Lett.* 21 (1996) p. 1547. Errata: *Opt. Lett.* 22 (1997) p. 484]. The holes are arranged transversely in a periodic array and are filled with a material which has a lower refractive index than the rest of the cladding, the core of the fibre comprising a transparent region which breaks the periodicity of the cladding. Typically, both the core and the cladding are made from pure fused silica and the holes are filled with air. The core diameter is approximately 5 $\mu$m and the flat-to-flat width of the whole fibre is around 40 $\mu$m. Pith a hole spacing of around 2–3 $\mu$m. If the diameter of the air holes in the fibre is a sufficiently small fraction of the pitch or spacing between the holes, the core of the fibre guides light in a single mode.

Single mode fibres have advantages over multi mode fibres in the field of long distance telecommunication, laser power delivery and many sensor applications due to the fact that a light signal carried by the fibre travels in only one mode and therefore avoids the problem of intermodal dispersion that is encountered with multi mode fibres. Also, at a given wavelength the intensity of light across a single mode fibre is guaranteed to follow a single smooth, known and unchanging distribution. This is regardless of how light is launched into the fibre or of any disturbance of the fibre (e.g. time varying).

In many applications it is advantageous for an optical fibre to carry as much optical power as possible as, for example, any fibre inevitably attenuates the light passing through it. For example, for a given detector sensitivity, the length of a communications link can be increased by increasing the radiation power input to the fibre. As another example, there are many high power laser systems in industrial applications which could be made more simply if light could be channelled via a fibre rather than using conventional optical systems. There are, however, limits to the amount of light that can be carried by known optical fibres at a given time.

In a conventional fibre, comprising a core region surrounded by a lower refractive index cladding region, the material from which the fibre is made will ultimately suffer irreversible damage if the light intensity within the fibre exceeds a threshold value. At lower intensities, a number of intensity dependent non-linear optical processes can occur which, although non destructive to the fibre, nevertheless can degrade or even destroy an optical signal.

These problems may be alleviated by increasing the size of the core of the fibre which, for a given power, reduces the intensity of the light in the fibre, therefore allowing a greater power to be carried before the threshold for non linear processes are reached. However, if the core diameter alone is increased the fibre will become multi mode. This may be compensated by reducing the index difference between the core and the cladding. Eventually, however, it becomes difficult to control the uniformity of doping across the core. Furthermore, fibres with small index differences are susceptible to loss of light at bends. Therefore, there are limits to the extent to which an increased core size can be used to increase the power capacity of a single mode fibre.

Some of the non-linear effects are exacerbated by the presence of dopants in the core, which make the material more susceptible to these effects. At higher powers, doped fibres are more susceptible to irreversible damage. Dopants also make the fibre more susceptible to damage by ionising radiation which is an issue in the nuclear industry. This has been combated by making the core out of pure silica. Total internal reflection is maintained by introducing dopants to the cladding which reduce its refractive index and as less light is carried in the cladding than in the core, more power can be carried. However, this is limited by the fact that some of the light is carried in the doped cladding.

Furthermore, in conventional fibres, efficient coupling of high power lasers into the fibre is problematic as the light needs to be focused into a small spot and the intensity at the endface of the fibre is therefore larger than it would be if the core were larger. Optical damage at or near the endface of the fibre frequently limits the power of radiation that can be launched into it [S. W. Allison et al., *Appl. Opt.* 24 (1985) p. 3140]. The maximum continuous wave (cw) power that has been achieved in a conventional single-mode fibre is only around 15 W.

SUMMARY OF THE INVENTION

The invention overcomes the problem of the incompatibility of transmitting high power radiation using conventional fibres whilst retaining single mode behaviour. In particular, the fibre may be used as a waveguide for delivering radiation from one point to another, or may be used in a fibre amplifier or a fibre laser. The fibre may be capable of supporting a single mode of propagation of radiation having a maximum power in the region of 100 W–2 kW. Furthermore, if the core is undoped, the fibre is less susceptible to irreversible damage at high intensities compared to conventional (doped) fibres. The effects of non-linear optical processes in the fibre are reduced and a high power signal output from the fibre does not therefore suffer degradation. The fibre has a further advantage in that high power radiation may be efficiently coupled into the fibre without the need for focusing to a small beam spot size.

According to one aspect of the present invention, an optical fibre for transmitting radiation comprises;

a core comprising a substantially transparent core material having a core refractive index, n, and a length, l, and having a core diameter of at least 5 μm and a cladding region surrounding the length of core material, wherein the cladding region, comprises a first substantially transparent cladding material, having a first refractive index, and wherein the first substantially transparent cladding material has embedded along its length a substantially periodic array of holes, having a diameter, d, and being spaced apart by a pitch Λ, wherein the holes have a second refractive index which is less than the first refractive index, such that the dimensions of the hole diameter d, and the pitch, Λ, co-operate to give single mode propagation within the optical fibre independent of input radiation wavelength for any value of the pitch, Λ, for a substantially fixed d/Λ ratio.

If the holes have a diameter, d, and are spaced apart by a pitch Λ, the optical fibre may be single mode independently of input radiation wavelength for any value of the pitch, Λ, for a substantially fixed d/Λ ratio. The invention provides the advantage that the fibre may be made single mode for any wavelength across an extended wavelength range compared to that which may be achieved using conventional fibre. This is because for any wavelength across the extended range, the fibre remains single mode for a fixed d/Λ ratio.

Preferably, the first substantially transparent cladding material may have a refractive index not less than the core refractive index. In a preferred embodiment, the core diameter may be at least 10 μm. In a further preferred embodiment, the diameter of the core may be at least 20 μm.

In one embodiment of the invention, at least one hole in the array may be absent such that it forms the core of the optical fibre. The holes may be arranged in a substantially hexagonal pattern.

Preferably, the first substantially transparent cladding material may have a refractive index not less than the core refractive index. In a preferred embodiment, the core diameter may be at least 10 μm. In a further preferred embodiment, the diameter of the core may be at least 20 μm.

In one embodiment of the invention, at least one hole in the array may be absent such that it forms the core of the optical fibre. The holes may be arranged in a substantially hexagonal pattern.

The holes may be a vacuum region or may be filled with a second cladding material. For example, he second cladding material may be any substantially transparent material, may be air or another gas (e.g. hydrogen or hydrocarbon) may be a liquid (e.g. water, any other aqueous solution or a solution of dyes) or may be a solid (e.g. a glass malarial having a different refractive index from that of the first cladding material).

The first substantially transparent cladding material may have a substantially uniform first refractive index and the core material may have a substantially uniform core refractive index. The core material and the first substantially transparent cladding material may be the same material. For example, at least one of the core material and the first substantially transparent cladding material may be silica. Preferably, the diameter of the holes is not less than the wavelength of light to be guided in the fibre. In a preferred embodiment of the invention the spacing between the holes, Λ, is not less than one quarter of the core diameter, c, and not more than one half of the core diameter, c In one embodiment of the invention, the substantially transparent core material may comprise a dopant material, for example rare earth ions such as erbium.

According to a second aspect of the invention, a fibre amplifier for amplifying signal radiation comprises;

a length of the optical fibre as described herein, for receiving signal radiation of selected wavelength and transmitting said signal radiation along its length, wherein the core material comprises a dopant material along at least part of its length, a source of radiation for emitting pump radiation of a different selected wavelength for input to the length of the optical fibre, such that said part of the doped core material amplifies the signal radiation under the action of the pump radiation and wavelength-selective transmission means for selectively transmitting the pump radiation into the length of the optical fibre and for selectively outputting the amplified signal radiation from the fibre amplifier.

For example, the wavelength-selective transmission means may comprise an input lens and an output lens for focusing radiation and a dichroic mirror for selectively reflecting pump radiation into the optical fibre and for and selectively transmitting the amplified input radiation to be output from the fibre amplifier. Alternatively, the wavelength-selective transmission means comprise a fibre directional coupler having a wavelength dependent response.

The dopant material may comprise rare earth ions, for example erbium ions.

According to another aspect of the invention, a fibre laser for outputting laser radiation comprises;

a length of the optical fibre as herein described for selectively transmitting laser radiation having a selected wavelength along its length, wherein at least part of the length of the core material comprises a dopant material, a source of radiation for emitting pump radiation of a different selected wavelength for input to the length of the optical fibre, such that said doped core material amplifies the laser radiation under the action of the pump radiation.

wavelength-selective transmission means for selectively transmitting the pump radiation into the length of the optical fibre and for selectively outputting the amplified laser radiation from the fibre laser and feedback means for selectively feeding back a part of the amplified laser radiation such that said amplified laser radiation passes along the length of the optical fibre repeatedly and is further amplified.

The dopant material may comprise rare earth ions, such as erbium ions.

In one embodiment of the fibre laser, the wavelength-selective transmission means and the feedback means together may comprise two dichroic mirrors, wherein each of the dichroic mirrors are situated at different positions along the length of the optical fibre and wherein the doped core material is situated between the positions of the two dichroic mirrors.

In an alternative embodiment of the fibre laser, the feedback means and the wavelength-selective transmission means together may comprise two fibre gratings formed at two different positions along the length of the optical fibre such that the doped core material is situated between the two fibre gratings.

In another embodiment of this aspect of the invention, the fibre laser may be a ring resonator fibre laser wherein the feedback means comprise:

means for directing light emerging from one end of the length of optical fibre having a doped core material into the other end of said length of optical fibre.

According to another aspect of the invention, a system for transmitting radiation in a single mode of propagation comprises;

a plurality of lengths of the optical fibre as herein described arranged in a series such that each length of optical fibre receives input radiation from the previous length of optical fibre in the series and transmits output radiation to the subsequent length of the optical fibre in the series and each length being separated by amplification means for amplifying the radiation output from a length of the optical fibre so as to maintain the power of the radiation transmitted by the lengths of optical fibre above a predetermined power.

In a preferred embodiment, the amplification means may comprise a fibre amplifier as herein described.

BRIEF DESCRIPTION OF THE DRAWINGS

The invention will now be described by example only with reference to the following figures in which.

DETAILED DISCUSSION OF EMBODIMENTS

Figure 1:
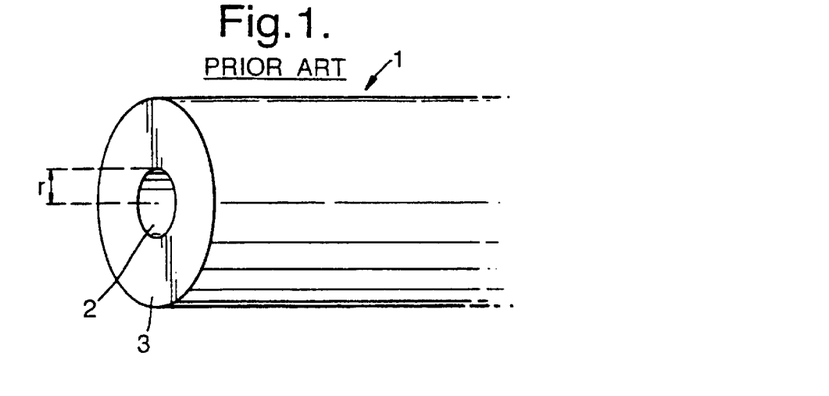
FIG. 1 shows a schematic diagram of a conventional step index optical fibre.

Referring to FIG. 1, a conventional step index fibre 1 comprises a circular core 2 of uniform refractive index $n_1$ and radius r surrounded by a cladding material 3 of uniform refractive index $n_2$. The number of guided modes the step index fibre 1 supports for light of wavelength $\lambda$ is determined by the V-value, where V is given by;

$$V = \frac{2\pi r}{\lambda} \sqrt{n_1^2 - n_2^2} \qquad \text{Equation 1}$$

The step index fibre is single mode only if V is less than 2.405. Hence, conventional single mode step index fibres are typically operated so that V is a little less then 2.405.

Note: The threshold level V for multi mode propagation in large core photonic crystal fibres is different to the threshold value for conventional single mode step index fibres. In practice the threshold level for multi mode propagation in a large core photonic crystal fibre is somewhat higher than the value for a conventional single mode step index fibre.

In a conventional step index optical fibre, such as that shown in FIG. 1, the material from which the fibre is made will ultimately suffer irreversible damage if the intensity of light propagating along the fibre exceeds a threshold value. For lower intensities of light, a number of non-linear optical processes can occur which can degrade or even destroy an optical signal. Although these problems can be alleviated by increasing the size of the core 2 of the fibre 1, if the core radius alone is increased the fibre will become multi mode. The refractive index difference between the core 2 and the cladding 3 must therefore simultaneously be reduced to compensate.

Figure 2A:
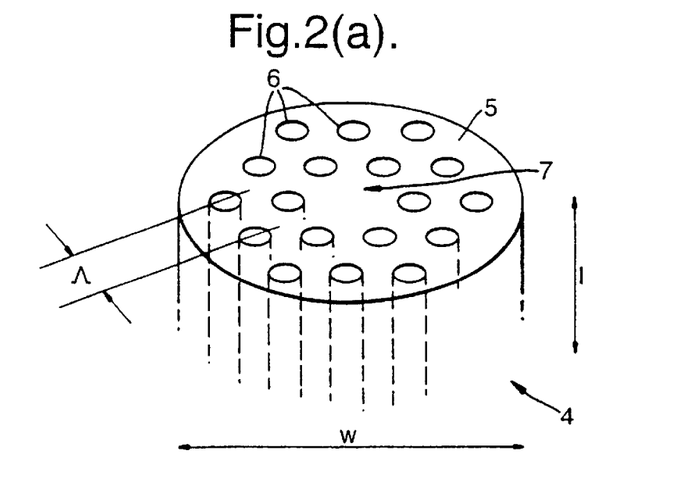
FIGS. 2a and 2b show schematic diagrams of a photonic crystal fibre.

The refractive indices of the core 2 and the cladding 3 may be controlled by introducing dopants into the material. Eventually, however, it becomes difficult to control the uniformity of doping across the core region 2. Furthermore, fibres with small index differences are susceptible to loss of light at bends. This limits the extent to which the core size can be increased to increase the power of radiation the fibre is capable of transmitting, or the power capacity of the fibre. FIG. 2(a) shows an optical fibre 4 of the invention which overcomes the power capacity problems associated with conventional fibres. The optical fibre 4 comprises a cladding of a first substantially transparent material 5, in which an array of holes 6 are embedded along the length, l, of the fibre. The holes 6 are arranged transversely in a periodic array and may be filled with a second material having a lower refractive index than the first cladding material. This second material may be a solid, liquid or gas material or, alternatively, the holes may be empty (i.e. a vacuum). For example, the core material 7 and the first cladding material 5 may be made from pure fused silica and the holes 6 may be filled with air.

Figure 2B:
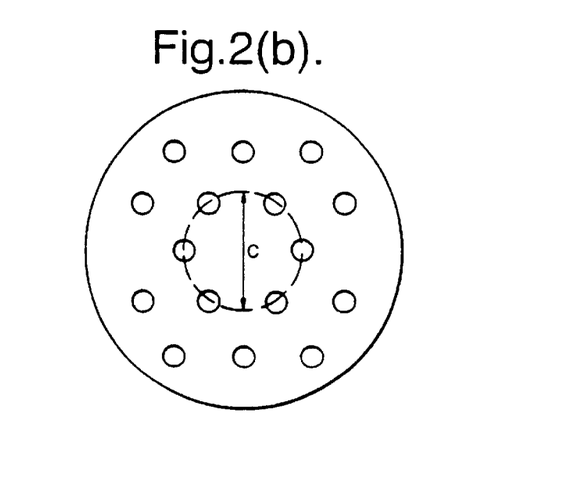

Substantially at the centre of the fibre cross section is a core region 7 of substantially transparent material which breaks the periodicity of the array of holes 6. For example, the central hole in the array may be absent and the region of the first cladding material in and around the site of the absent hole forms the core 7 of the fibre 4. The core of the fibre has a diameter, c, as shown in FIG. 2(b). For the purpose of this description, the core diameter of the fibre, c, shall be taken to be substantially the distance between the centre of one hole adjacent to the core and the centre of a diametrically opposite hole adjacent to the core.

The array of holes may form a hexagonal-type pattern (for example, as shown in FIG. 2(a)) but other hole patterns may also be envisaged.

In a conventional photonic crystal fibre, the outer width of fibre, w, is of the order of 40 $\mu$m, the centre-to-centre spacing (pitch,Λ) of the holes is approximately 2 μm. The solid core region has a diameter typically 4 μm, less than the diameter of the core of a conventional single mode fibre (see FIG. 1), for example as used in telecommunications applications. However, a photonic crystal fibre of this dimension is typically only be capable of transmitting radiation having a power of between 10–20 W. Such a fibre is not therefore suitable, for example, for use with high power laser systems, which may have output powers of at least 1 kW.

According to one aspect of the invention, a single mode optical fibre for delivering radiation from one point to another comprises a photonic crystal fibre, as shown in FIG. 2, wherein the diameter of the core 7 is at least 5 μm and preferably at least 10 μm. An increase in the core diameter of the photonic crystal fibre results in an increase in the amount of power that may be transmitted, it may be preferable for the diameter of the core to be larger still, for example in the region of 20–50 μm, depending on the particular application of the fibre. For the purpose of this specification, a photonic crystal fibre having a central core 7 with a diameter of at least 5 μm shall be referred to as a "large core photonic crystal fibre".

Furthermore, the large core photonic crystal fibre is capable of propagating radiation in a single mode. The fibre may therefore be used to transmit higher powers of radiation, due to the large core size, in a single mode of propagation than may be achieved conveniently using conventional optical fibres.

A large core photonic crystal fibre, having a core diameter of 50 μm, may be capable of supporting continuous wave radiation having a power of approximately 2 kW. This corresponds to the value obtained by extrapolating the best experimental results achieved for a conventional fibre. In a conventional, silica step index fibre, as shown in FIG. 1, the maximum continuous wave intensity of radiation that can be transmitted before the onset of permanent damage is 100 MW cm$^{-2}$ [W. Luthy, *Optical Engineering* 34 (1995) pp. 2361–2364]. For a core diameter of 12 μm this corresponds to a theoretical maximum power of only approximately 100 W. In practice, however, the theoretical maximum power is significantly reduced due to losses incurred in coupling radiation into the fibre and in fact the maximum continuous wave (cw) power that has been achieved in a conventional single-mode fibre is only around 15 W.

Figure 3A:
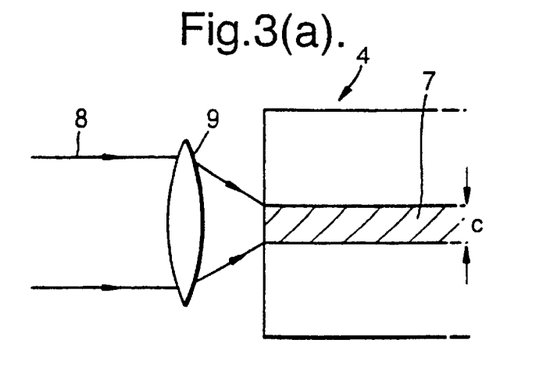
FIGS. 3a and 3b illustrates the advantage of coupling radiation into a relatively large photonic crystal fibre core.
Figure 3B:
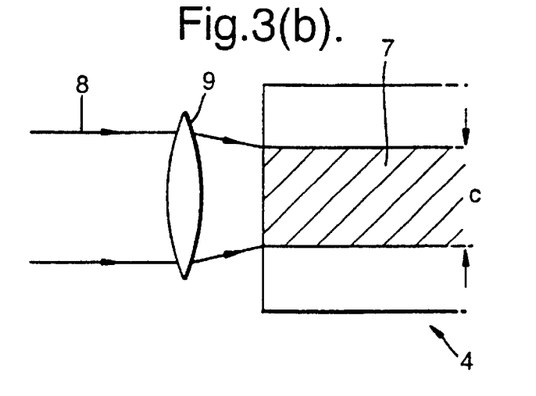

A further advantage of the large core photonic crystal fibre is that the coupling of radiation into the fibre may be achieved more easily. FIGS. 3(a) and 3(b) show schematic diagrams of, for example, laser radiation 8 being input to (a) a conventional photonic crystal fibre having a relatively small core and (b) a large core photonic crystal fibre, by means of a lens or lens arrangement 9. Referring to FIG. 3(b), if the core of the large core photonic crystal fibre 7 is comparable to the diameter of the beam of laser radiation, it may be possible to input the radiation 8 into fibre without the need for a lens 9.

The single mode large core photonic crystal fibre has application in high power laser systems used in industry such as, for example, those used in laser machining applications where there is a need to direct high power laser radiation onto a material to be machined. It is inconvenient and impractical to move the laser to redirect the laser beam and so conventional optics are used to guide the laser radiation in the required direction. The large core photonic crystal fibre would enable high power laser radiation to be guided without the need for complex and bulky optics.

The large core photonic crystal fibre may also be used in communications applications. Conventionally, a length of conventional optical fibre (as shown in FIG. 1) is used to deliver radiation from one point to another. As the intensity of radiation is attenuated as it is transmitted along the fibre, fibre amplifier devices, or repeaters, are used at various points along the length of the fibre to periodically enhance the power of transmitted radiation. Such devices detect a weak signal (i.e. the reduced power signal) emerging from a section of an optical fibre link, amplify it and send the amplified signal to the subsequent section of the link. The larger the power that can be supported by the fibre, the further the signal can travel through the optical fibre before amplification is required. Thus, the maximum power which can be carried by a fibre determines the spacing of the repeaters. However, the maximum power that can be carried by a fibre is limited by intensity-dependant non linear optical effects which can degrade the signal. A larger core area permits an increased power for a given intensity. The maximum fibre core area which may be used whilst still achieving a single mode of propagation therefore limits the repeater spacing to a minimum.

For given criteria of detectability, the repeater spacing for a standard fibre is 30 km [O. Audouin et al., *IEEE Photonics Technology Letters* (1995) pp. 1363–1365]. Using a large core photonic crystal fibre for transmitting radiation, having a fibre core diameter of approximately 50 μm, a repeater spacing of as much as 160 km may be sufficient (assuming the attenuation of the power in a photonic crystal fibre and a conventional fibre are similar). Thus, the transmission of optical signals can be achieved over large distances more conveniently and at less expense using the photonic crystal fibre. Furthermore, the large core photonic crystal fibre allows fibre links without the need for repeaters over distances where repeaters would otherwise be required when using conventional technology.

Figure 4:
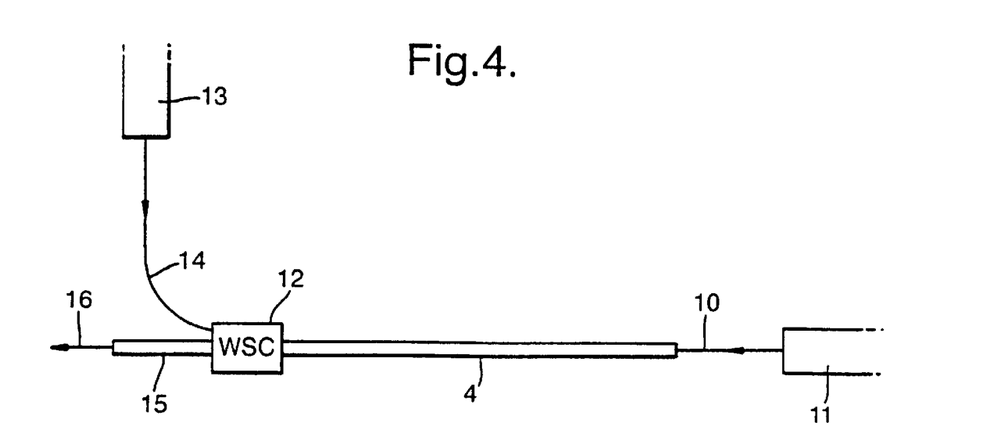
FIG. 4 shows a large core photonic crystal fibre amplifier.

Referring to FIG. 4, the large core photonic crystal fibre may also be used in a fibre amplifier system. A large core photonic crystal amplifier may typically comprise a length of fibre 4 having a core (not shown) which is doped with a small amount of a dopant material, such as erbium. The fibre amplifier also comprises a wavelength selective coupler (WSC) 12 and a pump radiation source 13 for emitting pump radiation 14. The pump radiation 14 has a short wavelength compared to that of the input radiation 10 and is introduced into one end of the length of fibre 4 via the WSC 12. Input signal radiation 10 from a radiation source 11, or a previous length of optical fibre, is input to the length of the fibre 4 at the opposite end.

The purpose of the WSC 12 is to insert radiation of one wavelength (i.e. the pump wavelength) without diverting radiation of another wavelength (i.e. the input radiation wavelength). Hence, pump radiation 14 may be input along the same fibre 4 as the signal radiation 10, without taking any signal radiation 10 out of the fibre 4. The pump radiation 14 excites the dopant ions in the core of the fibre 4, thus providing gain at the longer wavelength of the input radiation 10. The input radiation 10 is therefore amplified. The wavelength-selective coupler 12 selectively transmits the long-wavelength input radiation, thus generating the amplified output signal 16. This output signal 16 may be output through a length of fibre 15.

Typically, a commercially available wavelength-selective coupler comprises lengths of input and output fibre, the input fibre(s) of which is a conventional doped fibre (as in FIG. 1). In the large core photonic crystal fibre amplifier shown in FIG. 4, it may be preferable to include only large core photonic crystal fibre in the system, to avoid losing intensity as the signal is input to and output from the WSC 12.

Figure 5:
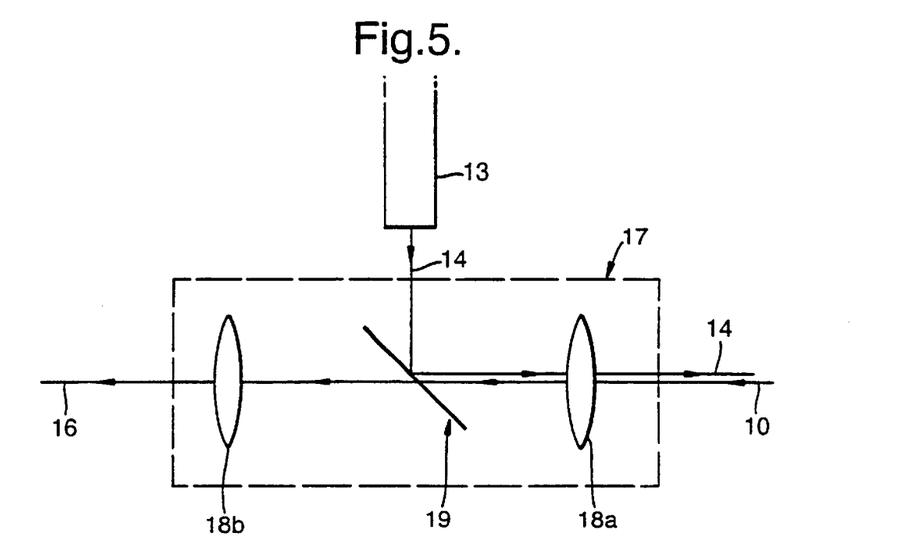
FIG. 5 shows a wavelength-selective coupler arrangement which may be used in the large core photonic crystal fibre amplifier shown in FIG. 6, FIGS. 6 and 7 show fibre laser configurations comprising a large core photonic crystal fibre.

The WSC 12 may be an all-fibre device such as a fused coupler or may be any fibre directional coupler device having a wavelength dependant response. Alternatively, FIG. 5 shows an example of an optical arrangement 17 which may be used as the wavelength selective coupler. For example, the optical arrangement may comprise input and output lenses 18a and 18b respectively, and a dichroic mirror 19. The mirror 19 is angled such that it reflects pump radiation 14 towards the input lens 18a and transmits input signal radiation 10.

In a fibre amplifier representing the limit of conventional technology comprising a step index optical fibre (as shown in FIG. 1) with a core diameter of 20 μm and transmitting pulsed radiation having a 1 ns pulse length, a peak power of 100 kW has been achieved [P. Nouchi et al., *Proc. Conference on optical fibre communication* (1995) pp. 260–261]. Using the photonic crystal fibre amplifier shown in FIG. 4, wherein the fibre 4 has a core diameter of approximately 50 μm, pulsed radiation having a 1 ns pulse and a peak power of at least 600 kW may be transmitted.

Figure 6:
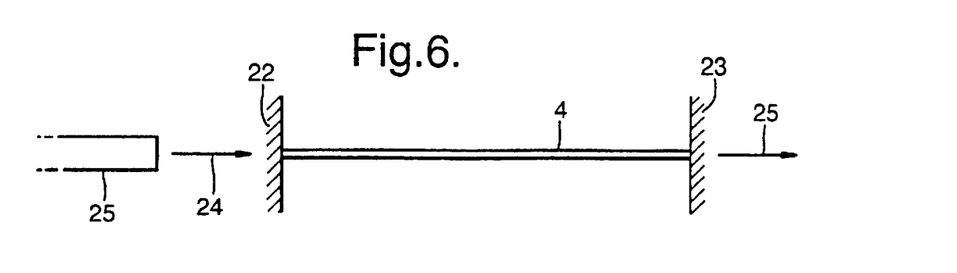
Figure 7:
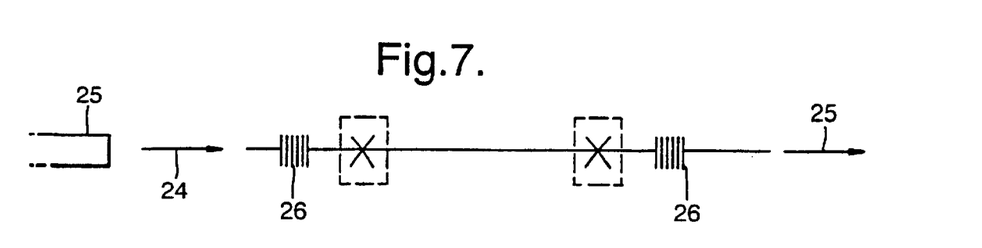

Another application of the large core photonic crystal fibre is in a fibre laser. Two possible configurations of a fibre laser are shown in FIGS. 6 and 7, although there are many other configurations of fibre laser devices in which a large core photonic crystal fibre may be used. For example, the large core photonic crystal fibre may be used in a ring resonator fibre laser, wherein the ends of the fibre are joined together so that laser radiation is transmitted around the "ring" of fibre and is continuously amplified.

Referring to FIG. 6, a fibre laser capable of outputting high power radiation may comprise a length of large core photonic crystal fibre 4 having a small amount of dopant material, such as erbium, within the core region (not illustrated). The fibre laser also comprises two dichroic mirrors, an input mirror 22 and an output mirror 23, at either end of the fibre 4. Radiation 24 from a source of pump radiation 25 (e.g. a laser) is input through the input mirror 22. This creates gain in the doped fibre region 4 between the mirrors 22,23 by exciting the erbium ions in the core of the fibre. The spontaneous emission from the excited erbium ions generates a small amount of signal radiation within the fibre 4 (not shown within the fibre) having a longer wavelength than the pump radiation 24. This signal radiation is amplified as it travels back and forth along the fibre, being reflected by the mirrors 22,23.

Typically, the dichroic mirror 22 may be designed to reflect approximately 99% of the signal radiation whilst transmitting the pump radiation 24, and the output dichroic mirror 23 may be designed to reflect approximately 80% of the laser radiation. Therefore, each time the signal radiation is reflected at the output mirror 23, a fraction will also emerge as the output signal 25.

A fibre laser is useful as it provides a source of laser radiation conveniently in the form of the fibre which may be easily coupled to subsequent lengths of optical fibre. Due to the high power capability of the large core photonic crystal fibre, a more powerful fibre laser output may be achieved than using conventional optical fibre.

Figures 8A, 8B, 8C:
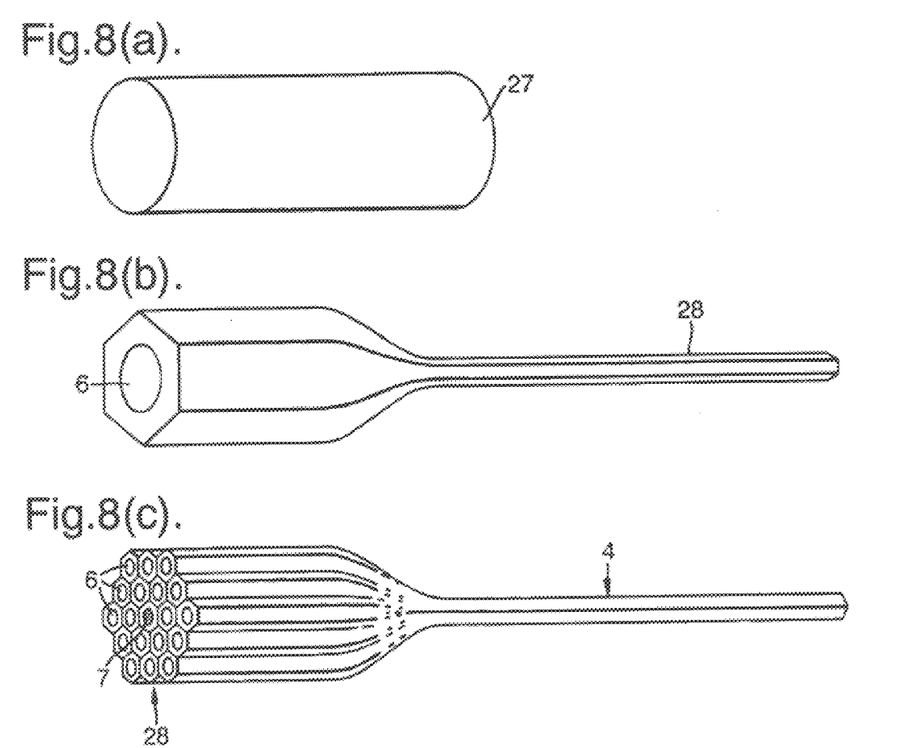
FIGS. 8a and 8c illustrates the stack and draw process which may be used to produce the large core photonic crystal fibre.

Referring to FIG. 7, an alternative configuration of a fibre laser may comprise fibre gratings 26 which have the function of the dichroic mirrors (FIG. 8). This configuration has an advantage in that it is an all-fibre device. There are many configurations of a fibre laser in which the large core photonic crystal fibre may be included and the use of the fibre in such a device is not intended to be restricted to the two examples shown. As another example, the large core photonic crystal fibre may be used in a ring resonator fibre laser, whereby one end of the large core photonic crystal fibre is connected to the other such that laser radiation passes continuously round the "ring" of large core photonic crystal fibre and is continuously amplified.

Typically, the large core photonic crystal fibre 4 may be made using a repeated stack and draw process from rods of fused silica [J. C. Knight et al., *Opt. Lett.* 21 (1996) p. 1547. Errata: *Opt. Lett.* 22 (1997)p. 484], as illustrated in FIG. 8. FIG. 8(a) shows a cylindrical rod of fused silica 27 in which a hole 6 (FIG. 8(b)) is drilled centrally along the length of the rod 8. Six flats are milled on the outside of the rod at a regular distance from the hole, giving the rod 27 a hexagonal cross section about the central hole 6. The rod 27 is then drawn into a cane 28 using a fibre drawing tower and the cane 28 is cut into the required length. The canes 28 are then stacked to form a hexagonal array of canes, as shown in FIG. 8(c), which forms the fibre 4. The cane at the centre of the array has no hole drilled through the centre and forms the core 7 of the fibre 4. The complete stack of canes is then drawn down into the final fibre using the fibre drawing tower.

Alternative fabrication techniques may also be used, for example, if circular cylindrical silica capillaries are available these may be used as the basic fibre element (i.e. capillaries already having the form of the canes 28). The would remove the need for the hole-drilling and milling steps in the aforementioned stack and draw process.

The fibre 4 comprises a first cladding material which is substantially transparent and is capable of being drawn into a fibre (as shown in FIG. 8(b)). The core material may be any substantially transparent material but need not necessarily be the same material as the first cladding material. Preferably, the refractive index of the first cladding material is not less than that of the core material.

The holes 6 may be empty e.g. a vacuum or may be filled with any material, a second cladding material, which has a lower refractive index than that of the first cladding material and is also capable of being drawn into a fibre, or any such material which may be inserted into the holes when they have been drawn to their small size. For example, the holes may be filled with air or another gas (e.g. hydrogen or hydrocarbon), a solid material (e.g. a different glass material having a different refractive index from that of the first cladding material) or a liquid (e.g. water, aqueous solutions or solutions of dyes). A second cladding material within the holes need not necessarily be transparent. As is clear from this description, the phrase "holes" shall not be taken to be limited in meaning to regions of absence within the first cladding material.

If the diameter of the air holes in the fibre is a sufficiently small fraction of the pitch or spacing between the holes, the core of the fibre guides light in a single mode. Preferably, the diameter of the air holes is not less than the wavelength of light to be guided in the fibre. The spacing between the holes is preferably not less than one quarter of the core diameter and not more than one half of the core diameter. Most typically, the spacing between the holes may be approximately one half of the core diameter.

The first cladding material and the core may have a uniform refractive index or may have a varying refractive index. For example, as well as the central hole in the array being absent, or smaller or larger than the other holes may also be absent or may be filled with different materials. The core 7 may also be doped with a dopant material, for example erbium or other rare earth elements, as in the fibre laser device shown in FIGS. 6 and 7.

Figure 9:
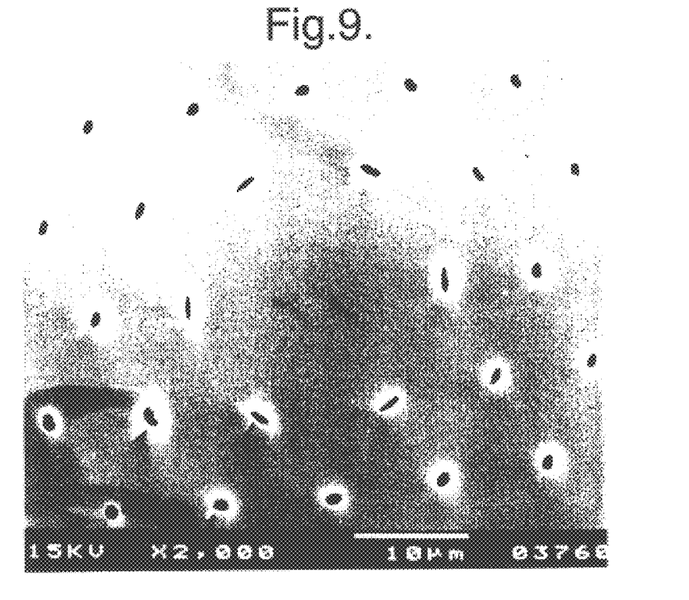
FIG. 9 shows an SEM image of the central region at the end face of a cleaved large core photonic crystal fibre of the invention.
Figure 10:
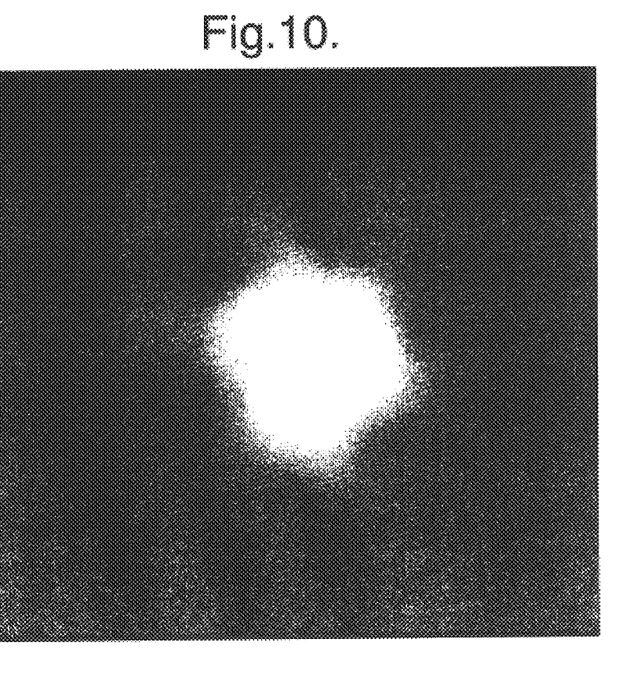
FIG. 10 shows the near field pattern at the output of the photonic crystal fibre shown in FIG. 9.

FIG. 9 shows an SEM image of the central region at the end face of a cleaved PCF. The central hole is absent leaving a core of diameter 22 μm bounded by the innermost six holes. The fibre is 180 μm across, and the relative hole size, d/Λ, is 0.12. FIG. 10 shows the near field pattern at the output of the large core PCF shown in FIG. 9 for incident light of wavelength 458 nm. The image is saturated at the centre of the pattern to show the weaker features at he edges. The periphery of the pattern is concave where it abuts the six innermost air holes.

Light of wavelength 458 nm was launched into the fibre and index matching fluid was applied to the structure to strip cladding modes. As the launch conditions were varied the output was observed. No multiple modes were excited in the near field pattern and the output of the PCF, as shown in FIG. 5, was unaffected. Even though the core diameter is 50 times the wavelength of incident light, the fibre remained single mode. Scaling this result to a wavelength of 1550 nm, a similar PCF with a core diameter of 75 μm would also be single mode.

Figure 11A:
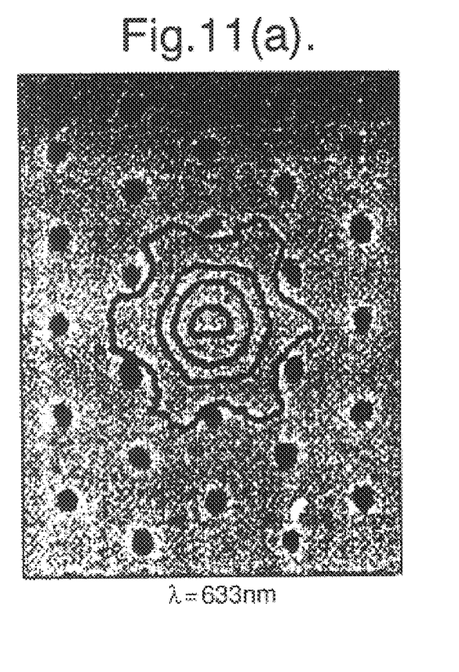
FIGS. 11a and 11b shows near field near field distribution plots at the endface of a photonic crystal fibre and FIG. 12 shows effective V-value plots for a photonic crystal fibre.
Figure 11B:
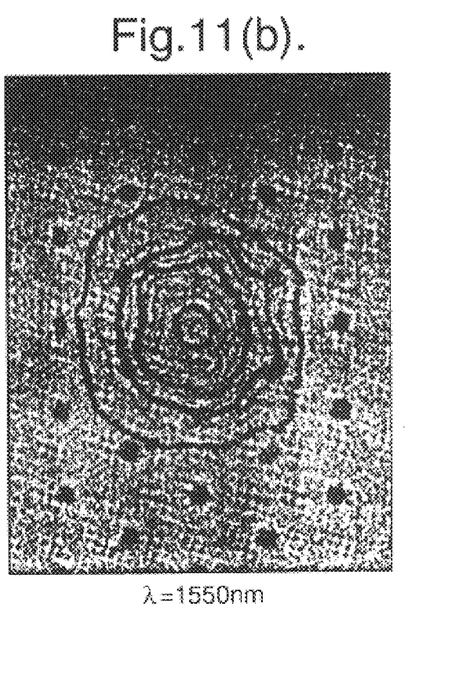

The behaviour of the large core photonic crystal fibre of the present invention may be understood in terms of the effective refractive index, $n_2$, of the cladding 5 at different wavelengths. FIGS. 11(a) and 11(b) show near field distribution plots at the endface 28 of a photonic crystal fibre 4 wherein the core material 7 and the first cladding material are silica and the holes 6 are filled with air.

Referring to FIG. 11(b), at long wavelengths (e.g. 1500 nm), light propagating through the fibre 4 images the array of holes poorly (see FIG. 3(b)) so a significant fraction of light propagates in the air holes 6. The effective refractive index of the cladding material 5, e.g. silica and air, is therefore reduced relative to the refractive index of pure silica, $n_1$, (i.e. the refractive index of the core 7). Referring to FIG. 11(a), at short wavelengths (e.g. 600 nm) light propagating along the fibre 4 images the array of holes 6 clearly and is substantially excluded from propagating through them. The effective refractive index, $n_2$, of silica cladding 5 surrounding the core 7 is therefore closer to the refractive index of pure silica (i.e. the refractive index of the core 7), $n_1$.

Hence, referring back to Equation 1, as the wavelength of light propagating through the fibre 4 is decreased, the V-value is raised by the explicit dependence on the wavelength λ. This increase is at least partially compensated by the reduction of the factor $(n_1^2 - n_2^2)^{1/2}$, where $n_1$ and $n_2$ are the effective refractive index of the silica cladding and the refractive index of pure silica (and the core 7) respectively. This makes the V-value less dependent on wavelength and therefore makes an extended wavelength range possible for which V is below the threshold for multi mode guidance for the structure.

Figure 12:
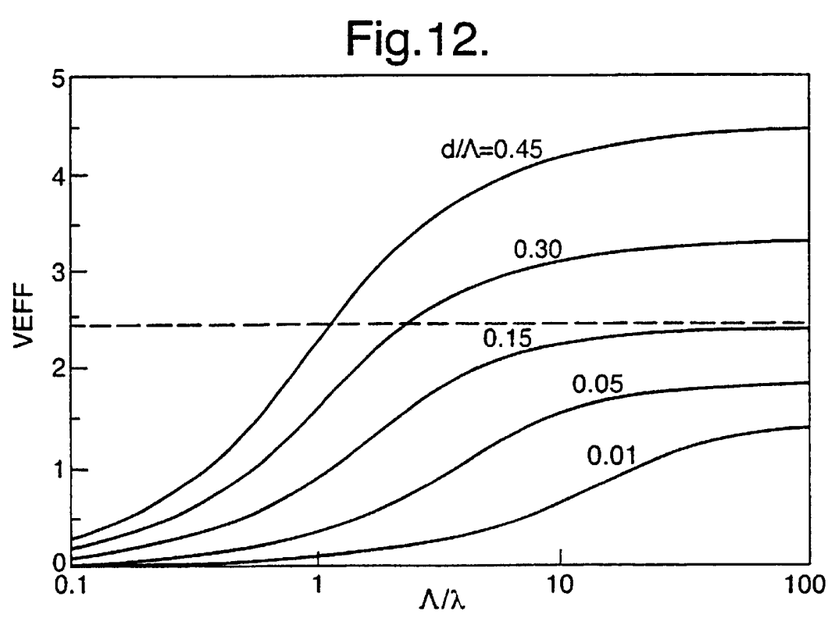

The wavelength dependence of V is not only reduced but is in fact completely eliminated in the limit of short wavelength. This is shown in FIG. 12 which shows a graph of the effective V-value ($V_{eff}$) of a fibre as the ratio of the hole pitch Λ to the wavelength λ varies. Each curve corresponds to a given ratio of the diameter d of the holes 6 to the pitch Λ. The $V_{eff}$–d/Λ curves are calculated by first calculating the effective refractive index $n_1$ of the cladding material 5 and then calculating $V_{eff}$ from Equation 1. The calculation assumes the radius of the core 7 is equal to the pitch Λ.

FIG. 12 shows that for each ratio of d/Λ, V is bounded above by the value as the ratio Λ/λ tends to infinity. This behaviour is in contrast to that of the conventional step index fibre for which V tends to infinity as r/λ tends to infinity.

Unlike a conventional step index fibre, a large core photonic crystal fibre may therefore be constructed so as to be single mode for any scale of structure. The fibre may therefore be single mode for any value of the pitch Λ provided that the ratio of d/Λ, where d is the diameter of the holes 6, is fixed.

The properties of the large core photonic crystal fibre make its suitable for use in several applications including use as a high power communications link, a high power fibre amplifier and a high power fibre laser. The fibre may also be used for the delivery of large optical powers for industrial applications, for example laser machining, and medical applications.

What is claimed is:

1. An optical fiber for transmitting radiation having a wavelength, said fiber comprising:
    a core comprised of a substantially transparent core material, having a core refractive index, and a length, and having a core diameter not equal to 4.6 μm; and
    a cladding region surrounding the length of core material, wherein the cladding region is comprised of a first substantially transparent cladding material, having a first refractive index, and wherein the first substantially transparent cladding material has a substantially periodic array of holes embedded therein, each hole having a diameter d, and said holes being spaced apart by a pitch Λ, wherein the holes have a second refractive index which is less than the first refractive index, the first and second refractive indices combining to produce an effective refractive index that has a value dependent on said wavelength of said radiation, such that, below a threshold wavelength, said radiation does not undergo a mode change during transmission along the length of the core material.

2. The optical fiber of claim 1, the first substantially transparent cladding material has a refractive index not less than the core refractive index.

3. The optical fiber of claim 1, wherein the core diameter is at least 5 μm.

4. The optical fiber of claim 1, wherein the core diameter is at least 10 μm.

5. The optical fiber of claim 1, wherein the core diameter is at least 20 μm.

6. The optical fiber of claim 1, wherein the core region is defined by a break in the periodicity of the clading structure caused by the absence of at least one hole in the array.

7. The optical fiber of claim 1, wherein the first substantially transparent cladding material has a substantially uniform refractive index.

8. The optical fiber of claim 1, wherein the core refractive index is substantially uniform.

9. The optical fiber of claim 1, wherein the core material and the first substantially transparent cladding material are comprised of the same material.

10. The optical fiber of claim 1, wherein at least one of the core material and the first substantially transparent cladding material are comprised of silica.

11. The optical fiber of claim 1, wherein the diameter of the holes is not less than the wavelength of said radiation.

12. The optical fiber of claim 1, wherein the pitch is not less than one quarter of the core diameter and not more than one half of the core diameter.

13. The optical fiber of claim 1, wherein the holes are a vacuum.

14. The optical fiber of claim 1, wherein the holes are filled with a second cladding material.

15. The optical fiber of claim 14, wherein the second cladding material is air.

16. The optical fiber of claim 14, wherein the second cladding material is a liquid.

17. The optical fiber of claim 14, wherein the second cladding material is a substantially transparent material.

18. The optical fiber of claim 1, wherein the substantially transparent core material is comprised of a dopant material.

19. The optical fiber of claim 1, wherein the holes are arranged in a substantially hexagonal pattern.

20. A fiber amplifier for amplifying input radiation, said amplifier comprising:
   a length of the optical fiber in accordance with 1, for receiving and transmitting said input radiation along said length, wherein the core material comprises a dopant material along at least a portion of said length;
   a source of radiation for emitting pump radiation of a different selected wavelength for input to the length of the optical fiber, such that said doped core material amplifies the input radiation under the action of the pump radiation; and
   a filter for selectively transmitting the pump radiation into the length of the optical fiber and for selectively outputting the amplified input radiation from the fiber amplifier.

21. The fiber amplifier of claim 20, wherein the filter comprises: an input lens and an output lens for focusing radiation; and
   a dichroic mirror for selectively reflecting pump radiation into the optical fiber and for selectively transmitting the amplified input radiation output from the fiber amplifier.

22. The fiber amplifier of claim 20, wherein the filter comprises a fiber directional coupler having a wavelength dependent response.

23. The fiber amplifier of claim 20, wherein the dopant material is comprised of rare earth ions.

24. The fiber amplifier of claim 20, wherein the dopant material is comprised of erbium ions.

25. A fiber laser for outputting laser radiation having a selected wavelength, said laser comprising:
   a length of the optical fiber in accordance with claim 1 for selectively transmitting said radiation, wherein at least part of the length of the core material is comprised of a dopant material;
   a source of radiation for emitting pump radiation of a selected wavelength different from said output laser radiation wavelength, for input to the length of the optical fiber, such that said doped core material amplifies the laser radiation under the action of the pump radiation;
   a filter for selectively transmitting the pump radiation into the length of the optical fiber and for selectively outputting the amplified laser radiation; and
   a feedback device for selectively feeding back a part of the amplified laser radiation such that said amplified laser radiation passes along the length of the optical fiber repeatedly and is further amplified.

26. The fiber laser of claim 25, wherein the dopant material is comprised of rare earth ions.

27. The fiber laser of claim 26, wherein the rare earth ions are erbium.

28. The fiber laser of claim 25, wherein the filter and the feedback device are comprised of two dichroic mirrors, wherein each of the dichroic mirrors are situated at a different position along the length of the optical fiber and wherein the doped core material is situated between the positions of the two dichroic mirrors.

29. The fiber laser of claim 25, wherein the feedback device and the filter are comprised of a first fiber grating formed at a first position along the length of the optical fiber, and a second fiber grating formed at a second position along the length of the optical fiber such that the doped core material is situated between the two fiber gratings.

30. The fiber laser of claim 25, wherein the feedback device is comprised of a fiber loop for directing light emerging from one end of the length of optical fiber having a doped core material into an other end of said length of optical fiber.

31. A system for transmitting radiation in a single mode of propagation, said system comprising:
   a plurality of lengths of the optical fiber in accordance with claim 1, said lengths arranged in a series such that each length of optical fiber receives input radiation from the previous length of optical fiber in the series and transmits output radiation to the subsequent length of the optical fiber in the series; and
   a plurality of amplifiers, each length being separated by at least one of said amplifiers for amplifying the radiation output from a length of the optical fiber so as to maintain the power of the radiation transmitted by the lengths of optical fiber above a predetermined power.

32. The system for transmitting radiation according to claim 31, wherein at least one of said amplifiers comprises:
   a source of radiation for emitting pump radiation of a different selected wavelength for input to said optical fiber such that said core material amplifies the input radiation under the action of the pump radiation; and
   a filter for selectively transmitting the pump radiation into the system for transmitting and for selectively outputting the amplified input radiation from the system for transmitting.

33. An optical fiber as claimed in claim 1, wherein the fiber operates in a single mode of operation.

34. An optical fiber as claimed in claim 1, wherein the fiber operates in a single mode of operation with an effective V-value of greater than 2.405.

35. An optical fiber as claimed in claim 1, wherein the fiber operates in a single mode of operation within a predetermined wavelength range with an effective V-value of greater than 2.405.

36. An optical fiber as claimed in claim 35, wherein the wavelength of the radiation falls within a wavelength range from approximately 450 nm to approximately 1550 nm.

37. An optical fiber as claimed in claim 35, wherein the wavelength of said radiation is greater than approximately half of the pitch.

38. A method of making an optical fiber according to claim 1, comprising the steps of:
   stacking lengths of hollow canes together to form a hexagonal array of hollow canes, each of said hollow canes comprised of said first substantially transparent cladding material surrounding said hole;
   including at least one solid cane amongst said hollow canes, said at least one solid cane comprising said core of the fiber; and
   drawing this stack of canes into the final fiber.

39. A method of transmitting radiation in a single mode of propagation comprising the steps of:
   arranging a plurality of lengths of the optical fiber of claim 1 in a series;
   serially connecting said lengths of said optical fiber such that radiation emanating from one length of optical fiber enters the next length of optical fiber in the series; and
   amplifying the signal between subsequent lengths so as to maintain the power of the radiation transmitted by the lengths of optical fiber above a predetermined power.

* * * * *